United States Patent [19]

Bedenk et al.

[11] 3,708,308

[45] Jan. 2, 1973

[54] PRODUCTION OF PUFFED READY-TO-EAT CEREAL PRODUCTS

[75] Inventors: William T. Bedenk; John W. Mitchell, both of Cincinnati, Ohio 45231

[73] Assignee: The Proctor & Gamble Co., Cincinnati, Ohio

[22] Filed: Sept. 30, 1970

[21] Appl. No.: 76,990

[52] U.S. Cl.............................................99/81, 99/82
[51] Int. Cl. .................................................A23l 1/18
[58] Field of Search..........................99/80 R, 81, 82

[56] References Cited

UNITED STATES PATENTS

| 2,801,176 | 7/1957 | Ozai-Durrani | 99/80 R |
| 2,701,200 | 2/1955 | Haber | 99/81 |
| 3,117,006 | 1/1964 | Wenger | 99/80 R |

*Primary Examiner*—Raymond N. Jones
*Attorney*—Edmund J. Sease and Richard C. Witte

[57] ABSTRACT

Production of a ready-to-eat breakfast cereal containing corn is improved by subjecting the corn to intensive milling to increase its free starch content to at least 12 percent prior to processing it into the breakfast cereal. The milling of the corn results primarily in increased puffability and thereby tenderness.

10 Claims, No Drawings

PRODUCTION OF PUFFED READY-TO-EAT CEREAL PRODUCTS

BACKGROUND OF THE INVENTION

This invention relates to processing of corn into breakfast cereals and products produced by the process. More particularly, the breakfast cereals are of a class belonging to the ready-to-eat or cold cereal product class, the two terms being used herein interchangeably in describing the invention.

The use of corn in cold cereal products is well known. Prior art methods of processing corn into a form suitable for human consumption involve the cooking of the corn in the presence of water to thoroughly gelatinize the corn and then a series of final processing steps largely dependent on the final form of cold cereal product desired. For instance, cold cereal products can be found in the form of flakes, puffed spherical shapes, biscuits, shreds and granules. A problem particularly peculiar with respect to the cereal making of the flaked and puffed spherical shaped cereal products is encountered in the puffing operation. During this step relatively dense flakes and particles are converted into lighter, more porous flakes and particles by causing trapped moisture to change very rapidly from the liquid state to the vapor phase. The resultant puffed product is more crisp and tender than an unpuffed cereal product. The common methods of puffing involve the use of heat, the amount of which depends largely on the particular composition of the material undergoing puffing, the moisture content and the rate of heat transfer. Preferably as little heating as possible is used. Excessive heating causes the particles to become burnt thereby affecting the cereal particle's appearance and taste. Accordingly, the lowest degree of heat commensurate with proper puffing is always utilized.

Often corn breakfast cereals contain significant proportions of other materials as flavor enhancers or nutritional additives. For example, sugars, flavoring ingredients, coloring, soy flour, vitamins, and/or minerals are a part of the cold cereal formulations. Unfortunately while these extraneous materials may further enhance a corn cereal's acceptability, they oftentimes adversely affect that cereal's puffability. In particular, many of these materials have a depressant affect on the puffability thereby necessitating additional heating to cause a proper puffing. Higher temperatures though increase the danger of a burnt end product and are to be avoided if possible.

Heretofore, puffed-type foods containing corn and extraneous materials were hard to process because of the degree of difficulty experienced in the puffing operation. Corn-containing cereals having various flavoring and/or nutritional additives were especially difficult to puff without burning because of the need to use higher temperatures in the puffing operation to obtain the proper degree of puffing.

It is the object of this invention to provide a process for treating corn to improve its processability.

It is a further object to treat corn in a manner such that a cereal composition containing that corn will be easier to puff.

It is a still further object to process corn in such a manner that when a soy protein source is included in the formulation in a proportion such that the final end product contains at least 20 percent protein the resultant composition can be easily puffed.

It is also an object to produce novel cereal products containing specially processed corn.

These and other objects will become apparent from the following description of the invention.

SUMMARY OF THE INVENTION

Briefly stated this invention concerns the production of tasteful breakfast cereals containing corn. More specifically, the processability of corn is enhanced by subjecting cooked corn to milling of such intensity as to result in the liberation of starch. After this step the corn is processed into a form suitable for human consumption by known methods.

In an especially preferred embodiment of the invention, soy protein is added to the milled corn and further processed into a highly nutritional ready-to-eat breakfast cereal.

DESCRIPTION OF THE INVENTION

In the present invention there are produced cold cereal products containing specially processed corn. In particular, corn-containing cold cereal products of the puffed type are produced wherein the corn has been milled to rupture the starch granules. In an alternative aspect of the invention a high protein cold cereal product is produced by incorporating a soy protein source with the corn either prior to or after the special processing of the corn resulting in the starch liberation.

In accord with one embodiment of the invention, corn is first cooked in the presence of water or thoroughly gelatinized. Thereafter the corn is dried to a moisture content of less than 10 percent by weight and subjected to an intensive milling operation. The degree of milling is such that the free starch content of the corn is increased to at least 12 percent. This corn is then processed by conventional methods into a form suitable for human consumption.

One such method involves adding a sufficient amount of water to the milled corn to form an extrudable mass or dough and thereafter extruding the dough into strands of a relatively small cross sectional area. These strands are then sliced to form small particles. At this stage of the process the particles can be flaked and puffed or immediately puffed to form the final product. Additional steps such as toasting or coating to enhance the product's appearance and/or taste can be made a part of the process.

The cooking of corn can be done by any conventional method and is performed under conditions commonly used in the industry. Different methods of cooking include heating at atmospheric pressure in an agitated kettle, heating at elevated pressure in a tumbling type mixer and heating under high pressure in a continuous mixer-extruder. Regardless of the particular cooking method used, the important consideration is that sufficient water and cooking conditions be employed to assure a thorough gelatinization.

The preferred method of gelatinization is by cooking the corn in an extruder under pressure. Such a process is continuous and can be accomplished with greater ease. Additionally, the use of higher pressures attainable in an extruder allow the use of higher temperatures and lower water levels than possible with a batch-type cooking operation. The lower water level is attractive since it minimizes the amount of drying required in subsequent steps. Using an extrusion type process at 100 psig to 200 psig pressure and temperatures in the range of 250°F to 350°F, 12 to 25 percent water based on the total mixture is sufficient to gelatinize the corn.

After becoming thoroughly gelatinized, the corn is then subjected to milling to such an extent that the starch granules are ruptured thereby freeing some of the starch. As used herein, percent free starch is measured by starch damage analysis. The Wooster Method as described in Cereal Chem. 39:460–462 (1962) is used to measure starch damage.

The gelatinization of corn itself has the effect of freeing some starch, i.e., about 5 percent. The milling of the corn in accord with the description to follow, however, frees still more starch with the processability of a cereal composition containing that milled corn improving increasingly up to the point of approximately 15 percent free starch corn. Above this level no noticeable effect is obtained in the puffability of the product. Preferably at least 12 percent free starch, as measured by the above analysis, is desired. Most preferably the corn contains 12 to 15 percent free starch.

The manner in which the starch granules are ruptured is not important. However, normal grinding or milling, as often is done to remove the hulls, e.g., U.S. Pat. No. 2,801,176, or reduce the particle size, is not sufficient to free the starch to the minimum level needed for a marked improvement. One method of supplying the requisite amount of energy needed for increasing the free starch content of cooked corn is to pass it through an impact mill. Essentially the impact mill comprises two plates facing one another with each containing concentric rows of pins that intermesh when the two plates are closed. One plate is stationary while the other plate is mounted for rotation. As the one plate is revolving the corn particles are fed into the mill and are subjected to a grinding effect by action of the aforementioned pins. The degree of milling is controlled by the rotational speed of the revolving plate, the number and spacing of the pins, the number of passes through the mill and the moisture content of the cooked corn.

For the most efficient use of the milling device, e.g., an impact mill, prior to milling the cooked corn is partially dried to below 10 percent by weight moisture based on the total mixture. Water levels above 10 percent act as a hinderance on the freeing of the starch in the corn and thus the corn is preferably partially dried prior to the milling operation. If the corn is initially cooked in an extruder, as above described, the resultant gelatinized corn may have less than 10 percent moisture as a result of flash drying and in which case no further drying is required. Preferably 5 to 10 percent by weight water is contained in the corn prior to being subjected to the starch liberation operation.

After the corn has been subjected to milling to the extent of raising its free starch content to greater than 12 percent, it can be further processed in a conventional manner to the final product. In a preferred process sufficient water is added to the specially processed corn to form a dough of a consistency suitable for extruding. This dough is extruded into strands, sliced into pellets, and then flaked and puffed or immediately puffed.

The extrusion operation has the effect of forming the dough into a shape easier to handle and more adaptable to existing equipment. Relatively low pressures in the extruder are sufficient for this operation. Pressures within the range of 500 to 1,000 psig are preferred. Lower pressures can be used but should preferably be avoided since less of a mixing action in the extruder results from the low compressive forces associated with low pressures. Pressures higher than 1,000 psig exert little extra benefits and for this reason are unnecessary. Temperatures employed in the extrusion process are not a critical feature but do have some effect on the handling characteristics of the extrudant, such as stickiness and body. Temperatures falling within the range of 140° to 200°F have been found to be satisfactory.

The shape of the strands that issue from the extruder is determined by the particular extruder die used in the outlet of the extruder and these strands, in turn, greatly influence the shape of the individual particles of the final product. For instance, if the shape of the strand is circular in its cross-sectional area the ready-to-eat cereal made from this strand will have a different shape or configuration than will a cereal product made from strands that are square, triangular, or any other shape in its cross-sectional area. The particular die used in the extruder is a matter of choice dictated primarily by the shape desired for the final product.

The strands that are extruded from the extruder are next cut so as to form pellet-like particles. The choice of the cross-sectional size of the strand issuing from the die and length of cut depends on the size requirement of the final individual piece of cereal. Such parameters are easily determined and need not be set out in detail here.

After pelletizing the pellet-like particles are tempered, if necessary, and further processed. Depending on the formulation and process conditions used throughout the process it may be necessary to allow the strands and freshly cut pellets to cool down and/or dry somewhat. This tempering has the effect of reducing the tackiness oftentimes associated with partially processed cereal dough. A hold time of up to 30 minutes is sufficient to temper the strands while a hold time of up to two minutes is sufficient for the freshly cut pellets. With some formulations there may be no sticking problem in which case the strands and/or pellets can pass directly to the next operation without any tempering step.

If a flake-type cereal product is desired, the next step after pelletizing is flaking of the pellets. Flaking is accomplished by passing the pellets between a pair of cooperating rollers or a roller and a flat surface spaced apart a distance sufficient to produce the desired flake thickness. In accord with this invention it has been found that a flake thickness of 7 to 12 mils is sufficient to produce a satisfactory product. As the flakes leave the rolls they are in a dense and relatively hard condition. Such a flake is unacceptable to the average consumer and, accordingly, an additional processing step must be taken to produce a lighter, more porous and more tender flake structure.

Breakfast cereals obtain the desired flake structure by a process known as puffing. Corn processed in accord with this invention is puffed very easily as a result of the starch liberation step. The main advantage gained from this is that the likelihood of flake burning is decreased because of the fact that less heat is needed to puff the corn cereal product of this invention as opposed to the conventionally processed corn.

Basically, a cereal is puffed by causing trapped moisture in the flake to change very rapidly from the liquid state to the vapor phase. Rapid heating or a rapid decrease in pressure are the methods commonly used throughout the industry. Gun puffing is an example of the principle of a rapid decrease in pressure. In this process the cereal flakes are first heated under high pressure and then the pressure is rapidly released to achieve the puffing effect. The process disclosed in U.S. Pat. No. 3,253,533 is an example of a rapid heating puffing method.

To achieve the optimum puffing, care must be taken in regard to the initial moisture content of the unpuffed flake. The specific moisture content that is best is dependent on the particular type of puffing process being utilized. For instance, a moisture content of 12 to 14 percent is best for gun puffing while 10 to 12 percent is best for puffing by a process that rapidly heats the flake. The optimum moisture content for any one puffing technique can routinely be determined experimentally.

Additional processing steps can be utilized if it is so desired. For instance a toasting operation can be used after the puffing step if it is desired to change the color of the flake to a more desired rich golden brown. Frequently, a slight toasting step also brings out a pleasant toasted flavor note.

In accord with another aspect of the present invention, a soy protein source is added to the basic formulation to produce a highly nutritional breakfast cereal. The addition of soy protein to corn has the detrimental effect of hindering the puffing process and, therefore, has heretofore in the absence of a partial hydrolysis reaction been limited to minor additions. For disclosures as to the partial hydrolysis of the soy protein source, see commonly assigned copending applications Ser. No. 50,980, *Production of Ready-to-Eat Breakfast Cereals Containing Soy Flour*, by Alexander L. Liepa; Ser. No. 50,925, *High Protein Ready-to-Eat Breakfast Cereals Containing Soy Concentrate*, by William T. Bedenk; and Ser. No. 50,924, *High Protein Ready-to-Eat Breakfast Cereals Containing Soy Isolate*, by William T. Bedenk.

However, because of the enhanced puffability of the specially processed corn, as above described, the depressant effect of the soy protein can be tolerated. The soy protein source is soy flour, soy protein concentrate or soy protein isolate. The addition is made at any convenient spot in the operation. Preferably the proper amount of soy protein is added to the cooked and partially dried corn prior to the milling step. Thus, by passing both the corn and the soy protein through the milling step a very efficient mixing is obtained. Another benefit obtained by passing the corn and soy protein source through the milling operation simultaneously is that the resultant articles of each will be approximately the same size. Because of this a more even moisture distribution occurs more readily throughout the mixture with the result being that tempering times are reduced. Since moisture plays a part in puffing it is necessary to achieve a proper moisture distribution to assure proper puffing. In the absence of co-milling or tempering the flakes are poorly puffed and hence not tender.

It should be understood that the soy protein can also be added to corn after the corn has undergone the starch liberation operation. It being only necessary that the soy protein source and specially processed corn be efficiently mixed to obtain an intimate mixture.

The amount of soy protein admixed with the corn is determined basically by cost and taste consideration. Preferably the amount added is sufficient to give the final product a protein content of at least 20 percent by weight of the total product. The amount needed to arrive at this level can be figured by routine methods dependent on the exact protein contents of the soy protein source and corn. The respective protein contents of corn, soy flour, soy protein concentrate, and soy protein isolate are about 9 percent, 40 up to 70 percent, 70 up to 90 percent and 90 up to 100 percent. The exact contents are determined by known methods.

After the formulation is determined, the ingredients mixed, and the corn starch liberated to the degree taught herein, the mixture is processed as above described for corn along, i.e., a dough is formed, extruded, pelletized, flaked and/or puffed.

The flakes can also include various materials to improve taste, appearance and/or functional properties. For instance sugar, salt, flavoring, coloring and/or spices can be used in the formulation either in the original dough or as a coating on the puffed flake. Vitamins and minerals can also be included in the formulation to increase the nutritional value of the breakfast food.

The above preferred processes for making cold cereal products of substantially corn and of corn blended with soy protein have been described in regard to producing a product having a flake-type structure. However, if a puffed sphere-type product is desired the above described preferred processes only have to be modified slightly. After the formation of pellet-type particles and the tempering period, if any is required, the cereal particles are sent directly to the puffing operation, by-passing the flaking roll or rolls. Thus, the only modification in the process described for producing a flake product is the omission of passing the pellet-like particles through the flaking step.

It should be understood that the milled corn of this invention having its free starch content increased to at least 12 percent can be further processed into a ready-to-eat breakfast cereal by processes in addition to the previously described extruding, pelletizing, flaking and/or puffing process. For instance, one particularly preferred method is the "extrusion puffing" method. In this method the corn after being milled to the degree taught herein is mixed with other ingredients that go to making up the cold cereal composition, and thereafter fed into an extruder-puffer. Under operating conditions of 500–1,000 psig at the puffing end, temperatures of 280° to 320°F and a speed of rotation of the extruder screw of 120–300 rpm, a very satisfactory puffed cold cereal product is obtained. Soy protein (including partially hydrolyzed soy protein) can also be added to the milled corn prior to passing through the extruder-puffer in the proportion desired. The addition of a soy protein source in an amount sufficient to form a ready-to-eat breakfast cereal having a protein content of at least 20 percent is especially desired.

The following examples are given for the purpose of illustrating the production of the novel cold cereal products. Unless otherwise indicated all percentages given are on a weight basis.

EXAMPLE 1

| Formulation: | |
| --- | --- |
| Brewer's grits (corn) | 500 grams |
| Sucrose | 30 grams |
| Salt | 15 grams |

Brewer's grits, sucrose, and salt are blended with 150 grams water to make a mixture having 21.6 percent moisture. This mixture is fed into an extruder. The corn is gelatinized in the extruder under a pressure of approximately 150 psig and 300°F. The resultant extrudant is then dried by a forced air dryer to a moisture content of about 7 percent based on the total weight of the mixture. This partially dried mixture is then passed through an Alpine Kolloplex 160Z impact mill rotating at a speed of 7,550 rpm. Starch damage analysis as measured by the method earlier described herein shows that free starch content of the corn is 15 percent. 545 grams of water are added to the impact milled corn to form a dough having a moisture content of about 50 percent. This dough is then extruded into strands having a diameter of about three-sixteenth inch. These strands are then sliced into pellets of approximately 3/16 inch length. The pellets are next passed between a 2-roll mill to produce flakes having a thickness of about 11 mils. The flakes are now partially dried in a rotary dryer to a moisture content of about 12 percent. A puffer apparatus containing salt heated to a temperature of about 350°F and having a residence time of 8 seconds is used to puff the flakes to the degree desired.

A more detailed description of a puffer apparatus useful in this invention is described in commonly assigned copending application Ser. No. 76771, *Apparatus and Process of Puffing* by William T. Bedenk and Lawrence Grabel, now U.S. Pat. No. 3,680,473.

Control flakes having the same formulation are produced by the above method with the exception that the starch liberation operation is omitted. The resultant flakes are underpuffed and as a result less tender than the flakes made according to this invention. Increasing the salt temperature to 375°F results in better puffed flakes but also results in some burnt flakes.

EXAMPLE 2

| Formulation: | |
| --- | --- |
| Soy isolate | 200 grams |
| Brewer's grits (corn) | 500 grams |
| Sucrose | 50 grams |
| Salt | 25 grams |

The brewer's grits, sucrose and salt are blended with 575 grams water to make a mixture having 50 percent water. This mixture is added to a rotary cooker and cooked for one hour at 240°F under a pressure of 18 psig to cause a thorough gelatinization. This mixture is then dried to about 10 percent moisture by a forced air dryer. The soy isolate is then blended with the gelatinized corn mixture and passed through an impact mill of the type described in the above Example. This mill is operated at a speed of revolution of 7,550 rpm. Starch damage analysis as measured by the method described heretofore shows the free starch content of the corn to have risen to 14 percent. The impact milled mixture is next made into a dough and further processed into a ready-to-eat cereal by the process and conditions above described in Example 1, i.e., the dough is extruded, pelletized, flaked, and puffed. The resultant puffed flakes having a protein content of 29 percent are well puffed and are tender after exposure to milk.

Control flakes made of the same formulation and by the same process with the exception of the impact milling step did not puff properly under the same conditions as the flakes of this example containing the impact milled corn. As a result the control flakes are very tough and chewy after being wetted by milk. Increasing the salt temperature in the puffing apparatus to 400°F results in better puffed and hence more tender flakes but also produced some burnt flakes that imparted a bad taste to the product.

The above description has been made with reference to all of the cooked corn being subjected to milling to increase the total free starch content. It should be realized, though, that a portion of cooked corn can be milled to free its starch and then mixed with untreated cooked corn in proportions such that the free starch content of the total mixture exceeds 12 percent.

While the above description has been made with the milling of corn, other starch-containing cereals such as rice, oats, wheat, or barley can also be milled in the same manner to increase their free starch content and, hence, improve the puffability of a cold cereal composition containing them. Other food products are also contemplated by this invention in addition to cold cereals, e.g., snack foods.

What is claimed is:

1. In a process for the production of a puffed corn containing ready-to-eat breakfast cereal comprising the steps of cooking said corn at least until gelatinized, milling the gelatinized corn, extruding the gelatinized corn, pelletizing the extrudate, and puffing the pellets, the improvement which comprises milling the gelatinized corn to such an extent that the starch granules are ruptured, thereby increasing the free starch content of the corn to at least 12 percent.

2. The process of claim 1 wherein prior to milling the gelatinized corn is partially dried to a moisture content of less than 10 percent by weight of the total product.

3. A process for the production of a ready to eat breakfast cereal comprising:
   a. cooking corn in water thereby causing the corn to become gelatinized
   b. milling the gelatinized corn to such an extent that the starch granules are ruptured, thereby increasing the free starch content of the corn to at least 12 percent;
   c. extruding the corn of step (b) to form strands;
   d. pelletizing the strands; and
   e. puffing the pellets to form the ready-to-eat breakfast cereal.

4. The process of claim 3 further comprising, prior to milling, partially drying the gelatinized corn to a moisture content of less than 10 percent.

5. The process of claim 4 further comprising flaking the pellets prior to puffing.

6. The process of claim 3 further comprising adding a soy protein source to the corn at any convenient point prior to the puffing of step (e) to produce a ready-to-eat breakfast cereal having a protein content of at least 20 percent.

7. The process of claim 6 wherein the soy protein source is added to the corn prior to the milling step.

8. A process for the production of a ready to eat breakfast cereal comprising:
   a. cooking corn in water thereby causing the corn to become gelatinized;
   b. milling the gelatinized corn to such an extent that the starch granules are ruptured, thereby increasing the free starch content of the corn to at least 12 percent;
   c. extruding-puffing the corn of step (b) to form the ready-to-eat breakfast cereal.

9. The process of claim 8 wherein the milled gelatinized corn is extruded-puffed under a pressure of 500–1000 psig and a temperature of 280°–320°F.

10. The process of claim 8 wherein a sufficient amount of a soy protein source is added to the milled gelatinized corn prior to the extruding-puffing step to form a ready-to-eat breakfast cereal having a protein content of at least 20 percent.

* * * * *